United States Patent [19]

Kaufman et al.

[11] Patent Number: 5,470,241

[45] Date of Patent: Nov. 28, 1995

[54] RETENTION MECHANISM FOR MEMORY CARDS

[75] Inventors: John W. Kaufman, Hershey; Robert H. Frantz, Newville; John A. Root, Middletown, all of Pa.

[73] Assignee: The Whitaker Corporation, Wilmington, Del.

[21] Appl. No.: 259,406

[22] Filed: Jun. 14, 1994

Related U.S. Application Data

[63] Continuation-in-part of Ser. No. 171,057, Dec. 21, 1993, abandoned.

[51] Int. Cl.[6] ............................................... H01R 13/639
[52] U.S. Cl. ........................... 439/159; 439/327; 361/801
[58] Field of Search ....................................... 439/159, 327, 439/133, 328; 361/801, 740, 796, 732, 747, 737

[56] References Cited

U.S. PATENT DOCUMENTS

| | | | |
|---|---|---|---|
| 3,853,379 | 12/1974 | Goodman et al. | 361/801 X |
| 4,458,967 | 7/1984 | King et al. | 439/96 |
| 4,466,687 | 8/1984 | Frantz | 439/395 |
| 4,780,792 | 10/1988 | Harris et al. | 361/737 |
| 4,872,091 | 10/1989 | Maniwa et al. | 361/684 |
| 4,925,397 | 5/1990 | Mirand et al. | 361/801 X |
| 4,929,195 | 5/1990 | Seidoh | 439/610 |
| 4,952,161 | 8/1990 | Komatsu | 439/155 |
| 4,955,817 | 9/1990 | Sugai | 439/60 |
| 5,005,106 | 4/1991 | Kiku | 361/818 |
| 5,038,250 | 8/1991 | Uenaka et al. | 361/737 |
| 5,053,613 | 10/1991 | Onoda | 235/492 |
| 5,053,924 | 10/1991 | Kurgan | 361/818 |
| 5,149,276 | 9/1992 | Dixon | 439/159 |
| 5,153,818 | 10/1992 | Mukougawa et al. | 361/737 |
| 5,189,638 | 2/1993 | Kimura | 365/52 |
| 5,206,796 | 4/1993 | Thompson et al. | 361/818 |
| 5,231,274 | 7/1993 | Reynier et al. | 235/441 |
| 5,234,351 | 8/1993 | Dixon | 439/160 |
| 5,244,397 | 9/1993 | Anhalt | 439/101 |
| 5,288,247 | 2/1994 | Kaufman | 439/607 |
| 5,290,174 | 3/1994 | Woratyla et al. | 439/59 |
| 5,297,966 | 3/1994 | Brennian, Jr. et al. | 439/64 |
| 5,305,180 | 4/1994 | Mitchell et al. | 361/685 |
| 5,308,251 | 5/1994 | Kaufman et al. | 439/64 |
| 5,318,452 | 6/1994 | Brennian, Jr. et al. | 439/79 |
| 5,330,360 | 7/1994 | Marsh et al. | 439/76 |

OTHER PUBLICATIONS

IBM Technical Disclosure Bulletin; vol. 30 No. 5 Oct. 1987; pp. 289–290.
Memory/PC Card Connector (Compatible with PCMCIA, Release 2.0); Revised Dec. 1991.
Ser. No. 07/933,321—AMP Docket No. 15268—Filed Aug. 21, 1992 Patent to issue as 5,330,360 on Jul. 19, 1994.
Ser. No. 08/200,847—AMP Docket No. 15381A Filed Feb. 22, 1994, U.S. Pat. No. 5,389,001.
Ser. No. 08/043,316—AMP Docket No. 15467—Filed Apr. 6, 1993, U.S. Pat. No. 5,339,222.
Ser. No. 08/171,057—AMP Docket No. 15745—Filed Dec. 21, 1993.

*Primary Examiner*—P. Austin Bradley
*Assistant Examiner*—Jeanne M. Elpel
*Attorney, Agent, or Firm*—Katherine A. Nelson

[57] ABSTRACT

A card securing mechanism for retaining a card 90 in a reader includes a cam 66 pivotally mounted to a guide arm 20 associated with a side edge 94 of a card 90. The cam 66 is mounted at the entrance 34 of a card-receiving channel 30 proximate and beside a push button 36 slidably mounted along the guide arm 20 such that a first cam portion 74 can be rotated into and out of the channel 30. The first cam portion 74 has a notch 76 dimensioned to receive and secure a corner 96 of a card 90 when the card 90 is fully within a reader and the first portion 74 is rotated into the channel 30. A second cam portion 78 is adapted to be engaged by an actuator activated by the card ejection mechanism 50. The cam 66 is pivoted to a card engaging position upon insertion of a card 90 into the card reader. Upon activating the card ejection mechanism, the actuator permits cam 66 to be pivoted from a card engaging position to a card releasing position as the card 90 is urged outwardly of the channel 30 by a card ejection mechanism 50.

14 Claims, 14 Drawing Sheets

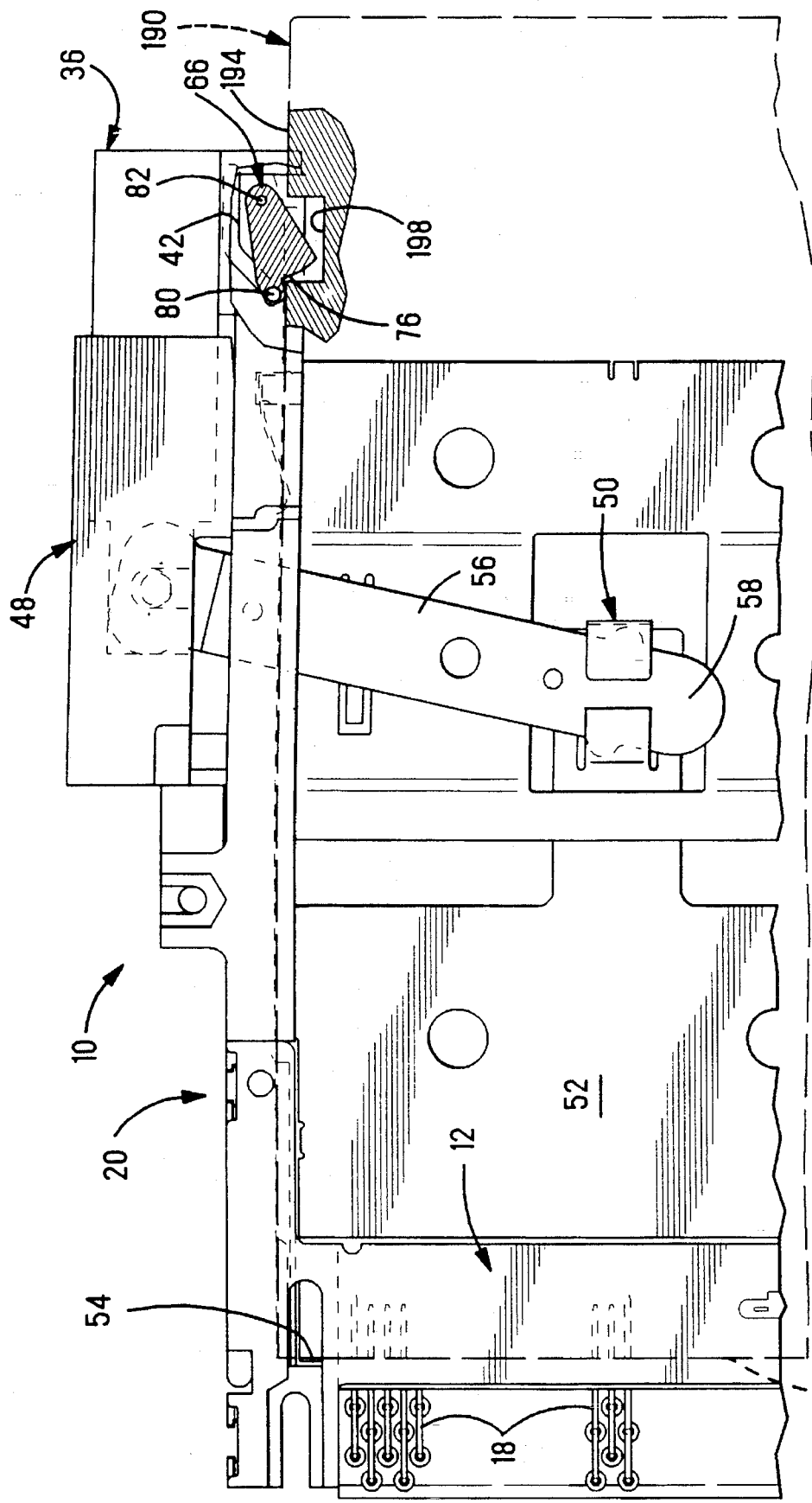

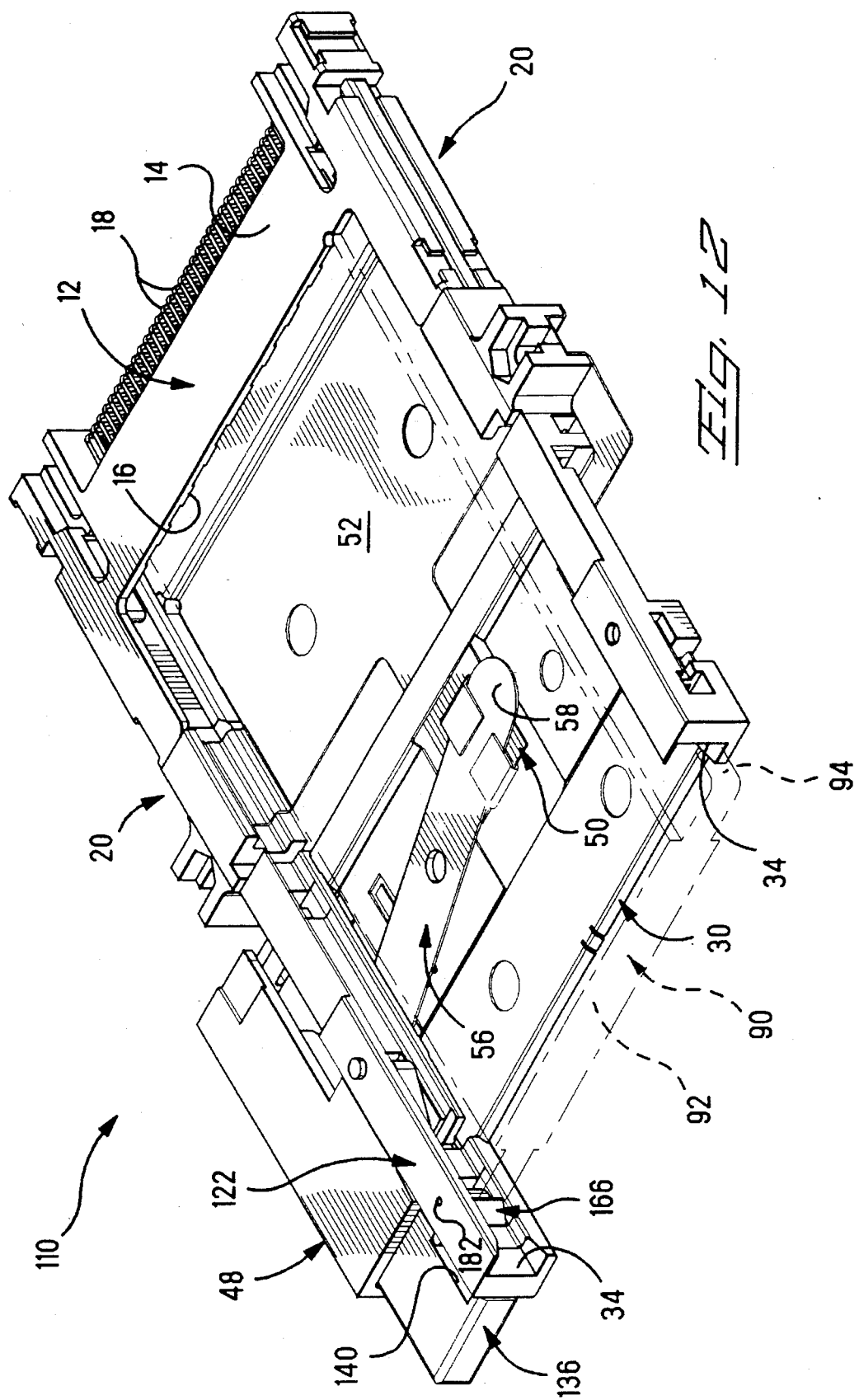

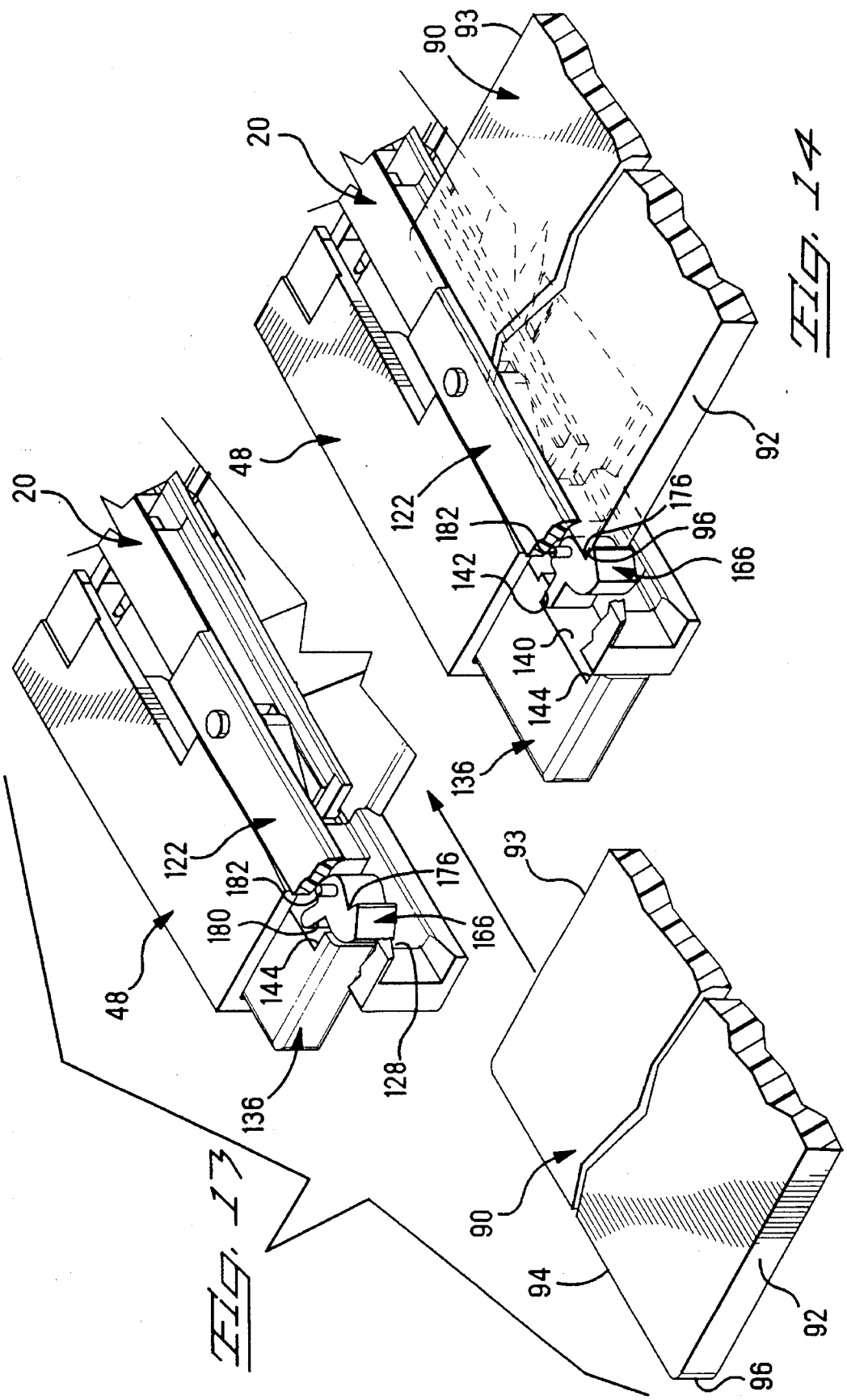

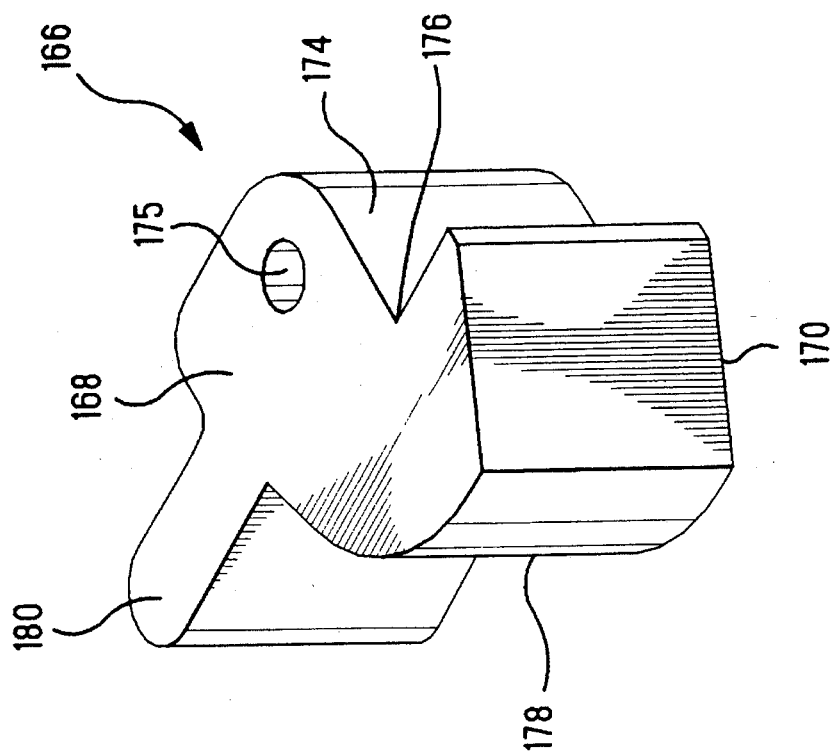
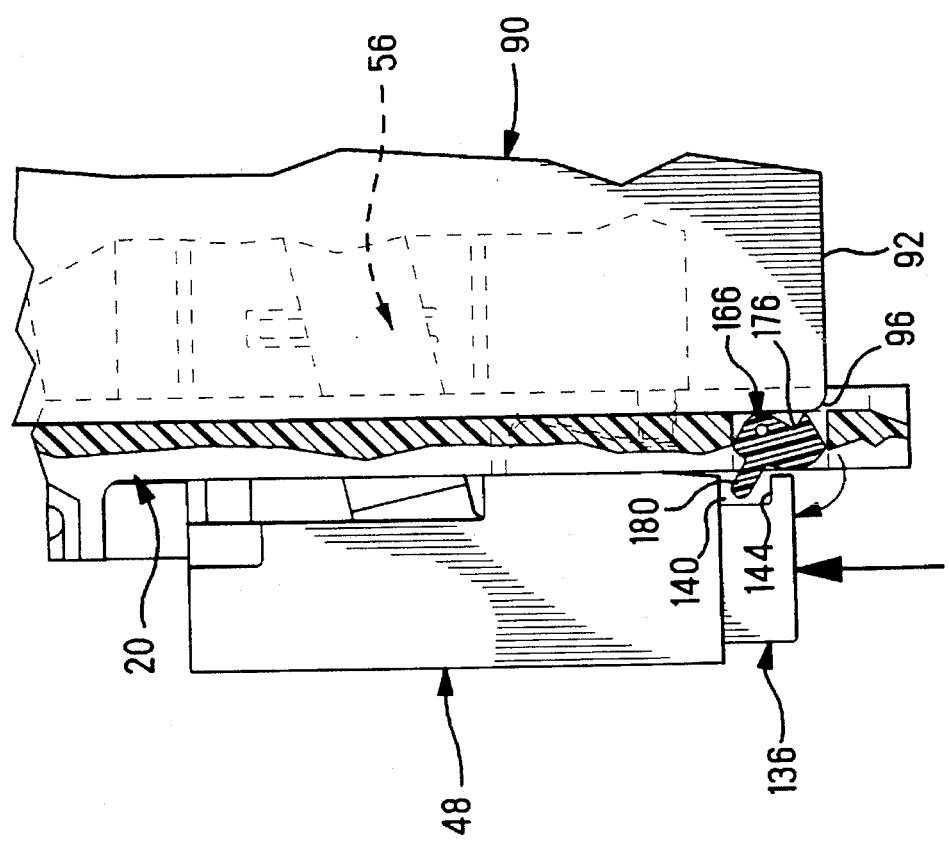
Fig. 19
Fig. 18

5,470,241

RETENTION MECHANISM FOR MEMORY CARDS

RELATED APPLICATION

This application is a continuation-in-part of U.S. patent application Ser. No. 08/171,057, filed Dec. 21, 1993, now abandoned.

FIELD OF THE INVENTION

This invention relates to card readers and more particularly to a means for retaining a memory card in a card reader.

BACKGROUND OF THE INVENTION

With the growth of data collection, storage and retrieval of information, the use of memory card technology has grown significantly. Many of the memory card devices use card ejection mechanisms activated by means of a push button mounted along the side of the card reader. Examples of such devices are disclosed in U.S. Pat. No. 4,952,161 and in U.S. Pat. No. 5,389,001, which is a continuation of Ser. No. 08/008,939, now abandoned, which in turn is a continuation-in-part of U.S. Pat. No. 5,318,482 filed Aug. 10, 1992, owned by the present assignee. The use of memory cards enables a great amount of data to be stored and retrieved relatively easily with a computer. Typically most memory cards are ejected from the card reader by means of a push button which urges the card outwardly from the reader to enable the person to grasp the end of the card and remove it from the reader. The ease of removal of cards form the card readers, however may present problems when the owner of the information desires to prevent unauthorized access to that information. It is desirable, therefore, to have a means preventing unauthorized persons from removing a memory card from the reader by depressing the push button or merely grabbing the end of the card.

SUMMARY OF THE INVENTION

The present invention is directed to a card securing mechanism for retaining a card in a card reader and releasing the card therefrom. The mechanism includes guide arms associated with opposite side edges of a card and mounted in a card reader spaced apart so as to define a card receiving channel aligned with an electrical connector that traverses the inward end of the channel. The guide arms extend at least toward a card engageable surface of the card ejection mechanism located at an inward end of the channel. A push button is slidably mounted within a housing along one of the guide arms near the open end of the card receiving channel, the push button being moveable alongside the card and adapted to activate the card ejection mechanism upon being pushed into the housing. A cam is pivotally mounted to one of the arms at the channel entrance proximate and beside the push button, a first portion of the cam being adapted to be rotated into and out of the card receiving channel. The cam has a notch in the first portion thereof dimensioned to receive and secure a corner of the card when a card is fully inserted within the reader and the first portion of the cam is rotated into the channel.

The cam has a second portion adapted to be engaged by an actuator activated by the card ejection mechanism. Upon full insertion of the card into the card receiving channel the second portion is engaged by the actuator and the cam is pivoted to a card engaging position capturing a corner of the card. Upon depressing the button, the corner is released from engagement with the second portion thereby permitting the cam to be pivoted from a card engaging position to a card releasing position as the card is urged outwardly of the channel by the card ejection mechanism. For purposes of the present invention, the term "corner of the card" or "card corner" is to be understood to include a corner along the outer edge of a card or a corner of a notch provided in an elongated card.

In one embodiment of the present invention, a plate is at least affixed to the card reader adjacent the cam and includes a slot into a cam adjacent surface thereof defining a path having a first portion parallel to the card receiving channel and a second portion extending at an angle from an inner end of the first path portion toward the card receiving channel. The plate is moveable parallel to the channel by the card ejector mechanism. The cam further includes a cam follower spaced from the pivot and extending into the path and is adapted to follow the first and second path portions as the plate is moved in a first direction upon card insertion thereby rotating the cam into a card engaging position capturing the card corner. Upon ejection of the card from the card reader the plate is moved in an opposed second direction and the cam follower exits the second path portion and enters the first path portion thereby rotating the cam to a card releasing position.

In another embodiment the cam has a push button engageable embossment along an opposed second portion thereof adapted to be received in a slot along the channel proximate side of the push button, the slot being defined between opposed actuation and slot end surfaces. Upon full insertion of the card into the card receiving channel the embossment is engaged by the actuation surface and the cam is pivoted to a card engaging position capturing the card corner. Upon depressing the button the actuation surface is disengaged from the embossment thus enabling the cam to be pivoted from the card engaging position to a card releasing position by the corner of said card as the card is urged outwardly of the channel by the card ejection mechanism activated by the push button.

Thus security for the information on the memory card reader can be provided by limiting access to the push button itself, such as, for example, a lockable sliding door or similar feature that covers the end of the button. Since a surface at the back of the card or in a notch of the card is held by the notch of the cam, the card cannot be removed merely by pulling at the end of the card.

It is an object of the invention to provide a card retention system that prevents removal of a memory card from a card reader without the deactivation of the card retention mechanism.

It is a further object of the invention to provide a retention mechanism that is operated by the same push button as an ejection system.

It is another object of the invention to provide a cost effective means for retaining a card within a pin header assembly.

Representative embodiments of the invention will now be described by way of example with reference to the accompanying drawings.

BRIEF DESCRIPTION OF THE DRAWINGS

FIG. 9 is an enlarged fragmentary top plan view, partially sectioned showing the card retention mechanism engaged in the notch of an extended card member.

FIG. 12 is a perspective view of a memory card holder having a card ejection mechanism and an alternative embodiment of the card retention mechanism of the present invention and a card, shown in phantom, inserted into the holder.

FIG. 13 is an enlarged fragmentary portion of FIG. 12 having part of the structure broken away to show the retention mechanism in its open position and the card ready to be inserted into the memory card holder.

FIG. 14 is a view similar to that of FIG. 13 with the card fully inserted into the memory card holder and showing the retention mechanism in its closed position.

FIG. 18 is a view similar to those of FIGS. 16 and 17 illustrating the removal of the card from the memory card holder.

FIG. 19 is a perspective view of the alternative embodiment of the cam member of the present invention.

DETAILED DESCRIPTION OF THE DRAWINGS

Figure 1:
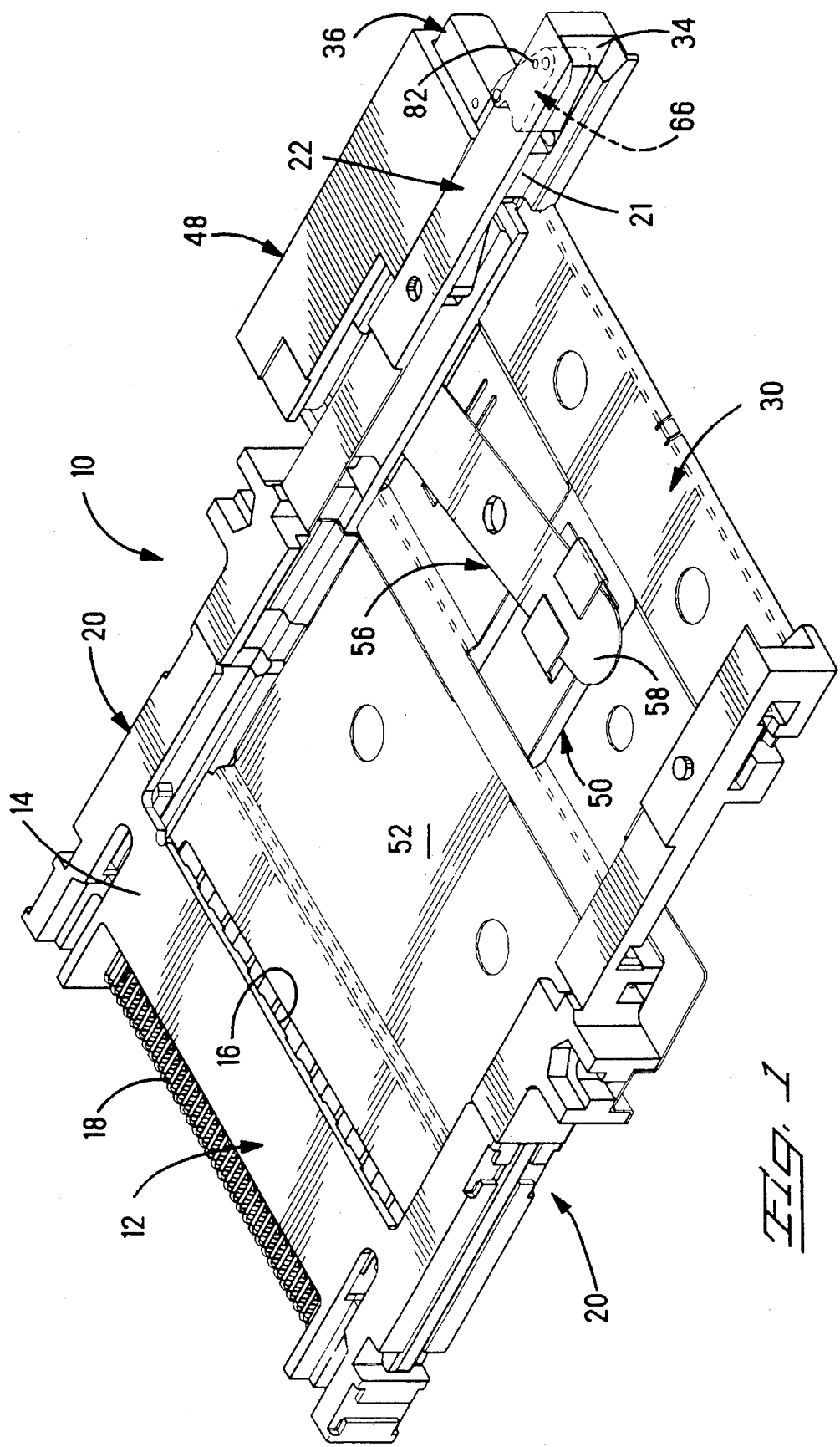
FIG. 1 is perspective view of a memory card holder having a card ejection mechanism and the card retention mechanism of the present invention, the holder being ready to receive a memory card therein.

Referring now to FIGS. 1, 2, 3 and 4, a memory card holder 10 includes a pair of guide arms 20 spaced apart to define a card receiving channel 30 and aligned with an electrical connector 12 traversing the inward end 32 of the channel 30, an ejection mechanism 50 for removing a card 90 from the holder 10, a push button 36 slidably mounted within a housing 48 and adapted to activate the card ejection mechanism 50 upon being pushed into the housing 48, and a cam pivotally mounted to one of the arms beside the push button 36, the cam 66 being adapted to be rotated into and out of the card receiving channel 30 from a card engaging position to a card releasing position. Memory card 90 includes opposed side edges 94, inward end edge 93 and outward end edge 92 having a corner 96 thereof. The present invention is also designed to be used with extended length memory cards, such as card 190, shown in FIG. 9. Card 190 includes opposed side edges 194, at least one of which includes a notch 198 adapted to receive portion 76 of cam 66 to secure card 190 in card holder 10. It is to be understood that the terms "card corner" and "corner of the card" include the notched portion of an extended card, such as 190, in addition to the corner of an outward edge of a standard length card, such as corner 96 and any other similar type of surface of a card used in a card holder.

Figure 5:
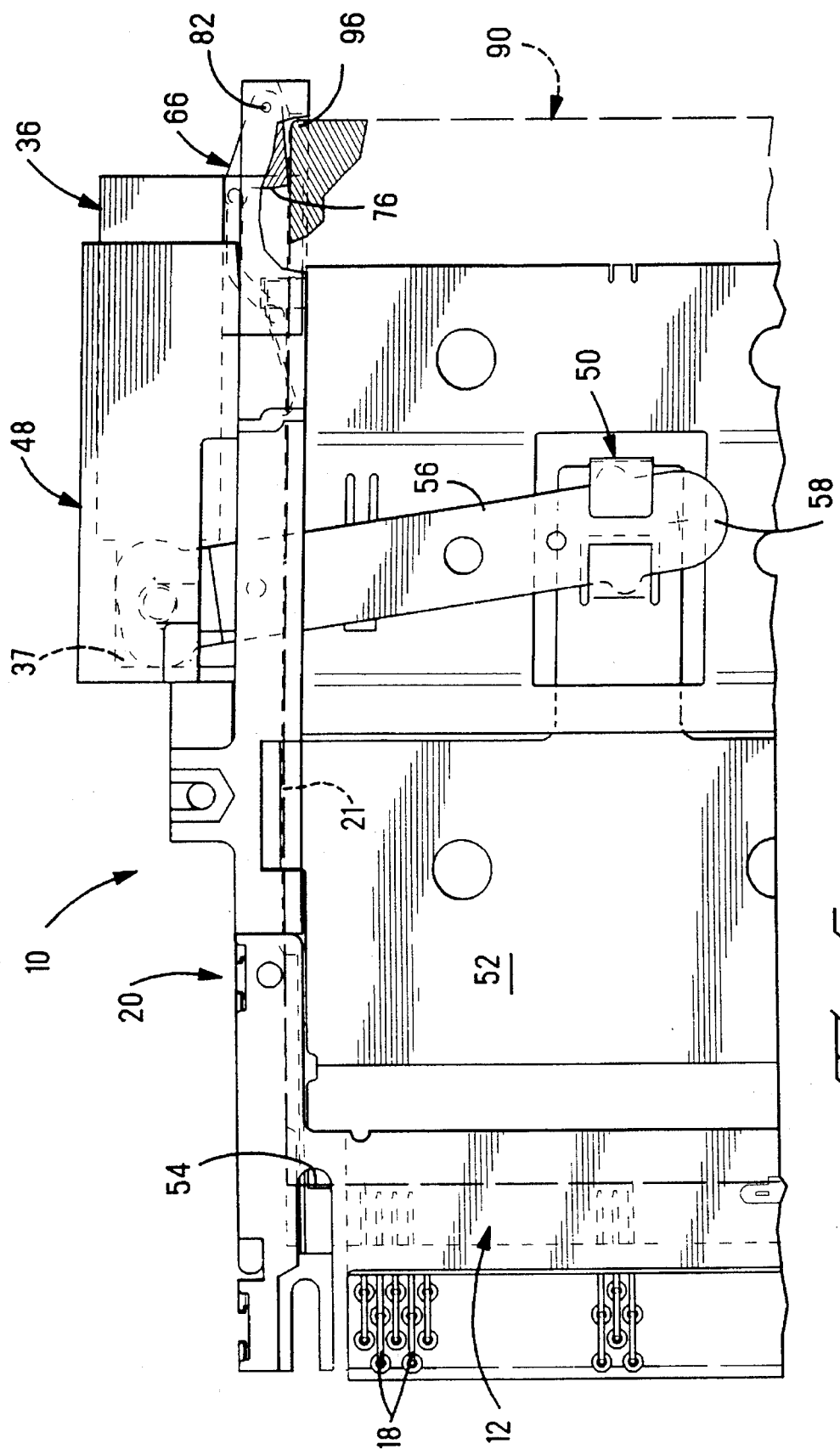
FIG. 5 is a fragmentary top plan view partially sectioned and showing the position of the retention mechanism during ejection of the card.
Figure 6:
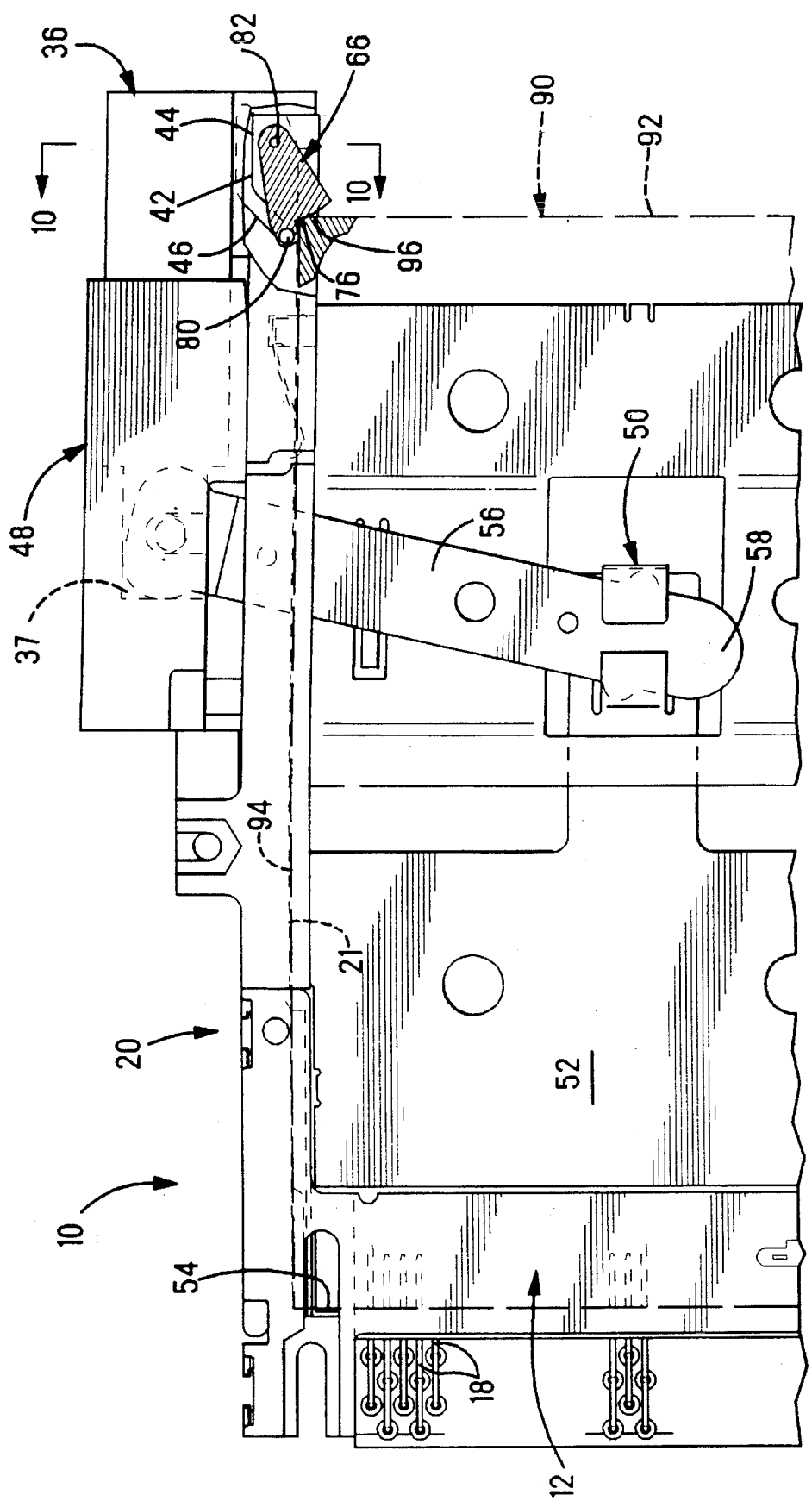
FIG. 6 is an enlarged fragmentary top plan view partially sectioned showing the position of the retention means after insertion of the card.
Figure 7:
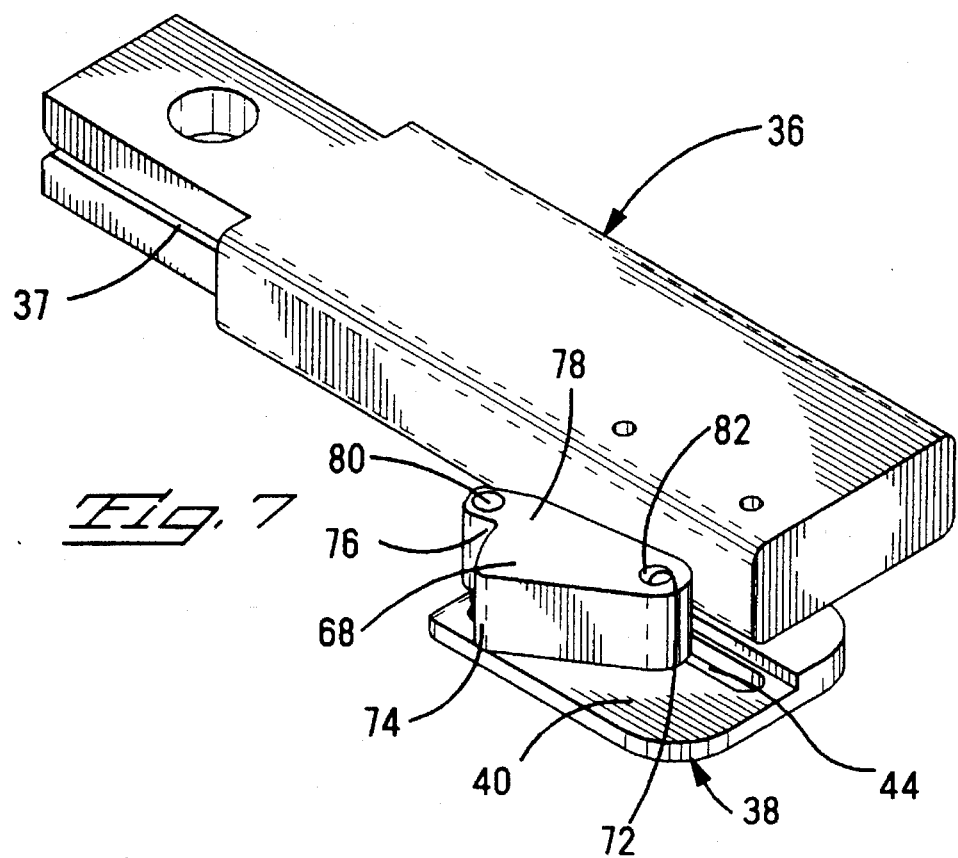
FIGS. 7 and 8 are perspective views of the push button, plate, and cam members of the present invention taken from the top and bottom surfaces respectively.
Figure 8:
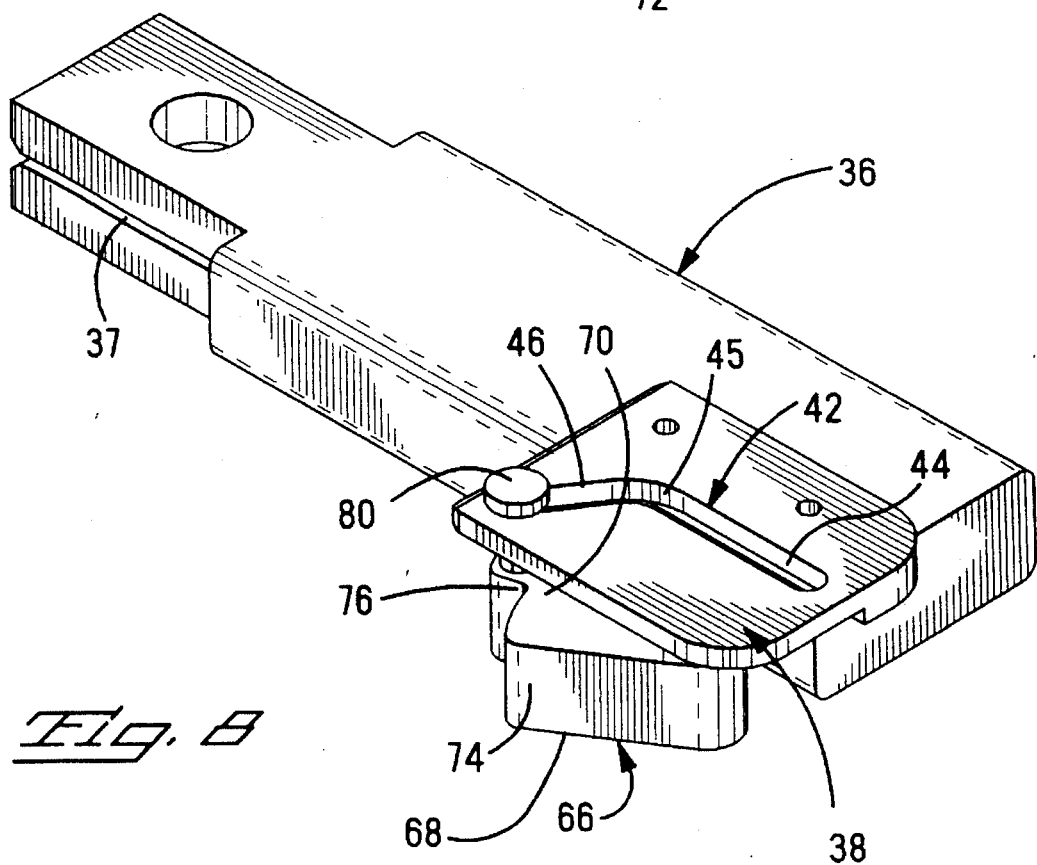

Connector 12 includes a housing 14 having a card receiving mouth 16 extending toward the inner end of the channel 30 and a plurality of terminals 18 adapted to be connected to a card reader, (not shown). The guide arms 20 extend along the ends of the electrical connector 12 and extend toward a card engageable surface, shown in FIGS. 5 and 6 as tabs 54, of the card ejection mechanism 50 located at the inward end of the channel 30. The push button 36 which is mounted at the entrance 34 of the card receiving channel 30 is moveable alongside the channel and is adapted to activate the card ejection mechanism 50. A plate 38 is at least affixed to the card reader 10 adjacent the cam 66. As best seen in FIGS. 7 and 8, plate 38 includes a slot 42 in a cam-adjacent surface thereof. Slot 42 includes a first path portion 44 extending parallel to the card-receiving channel 30 and a second path portion 46 extending at an angle from an inner end 45 of the first path portion toward the card-receiving channel 30. Plate 38 is movable parallel to the card-receiving channel by the card ejection mechanism 50. In the preferred embodiment plate 38 is affixed to push button 36 and more preferably plate 38 and push button 36 are formed as a single member from suitable materials as known in the art. Push button 36 further includes slot 37 at the forward end thereof for receiving a portion 60 of the ejection lever arm 56 as best seen in FIGS. 5 and 6. The guide arms 20 are associated with opposite side edges 94 of a card 90, the side edges of the card 94 being received in grooves 21 of the card guide arms.

As can be seen in FIGS. 1, 2, 3 and 4, one of the guide arms 20 includes a further portion 22 that extends the length of the side arm a sufficient distance to accommodate the cam 66. The cam 66 is pivotally mounted to portion 22 with pivot pin 82. The guide arm extension portion 22 includes apertures on the upper and lower surfaces thereof for receiving the pivot pin 82 that extends through the cam 66 when the unit is assembled.

Cam 66, as best seen in FIGS. 7 and 8, includes opposed surfaces 68,70 having a pivot pin receiving aperture 72 extending therebetween. Cam 66 further has first and second body portions 74,78. The first body portion 74 includes a notch 76 dimensioned to receive and secure a corner 96 of the card 90 when the card is fully inserted into the card holder 10. The second portion 78 includes a cam follower 80 extending into path 42 of plate 38 and adapted to follow the first and second path portions 44,46 as the plate 38 is moved upon card insertion and be pivoted from a card releasing position to a card engaging position thereby, as best seen in FIGS. 5 and 6. In the preferred embodiment, the push button 36 and cam 66 are made from dielectric materials such as high temperature liquid crystal polymers or other high temperature dielectrics as known in the art. Examples of dielectric materials include XYDAR® available from Amoco Performance Products, Inc., and Vectra® available from Hoechst Celanese. Die cast zinc or other suitable metals as known in the art may also be used.

Figure 2:
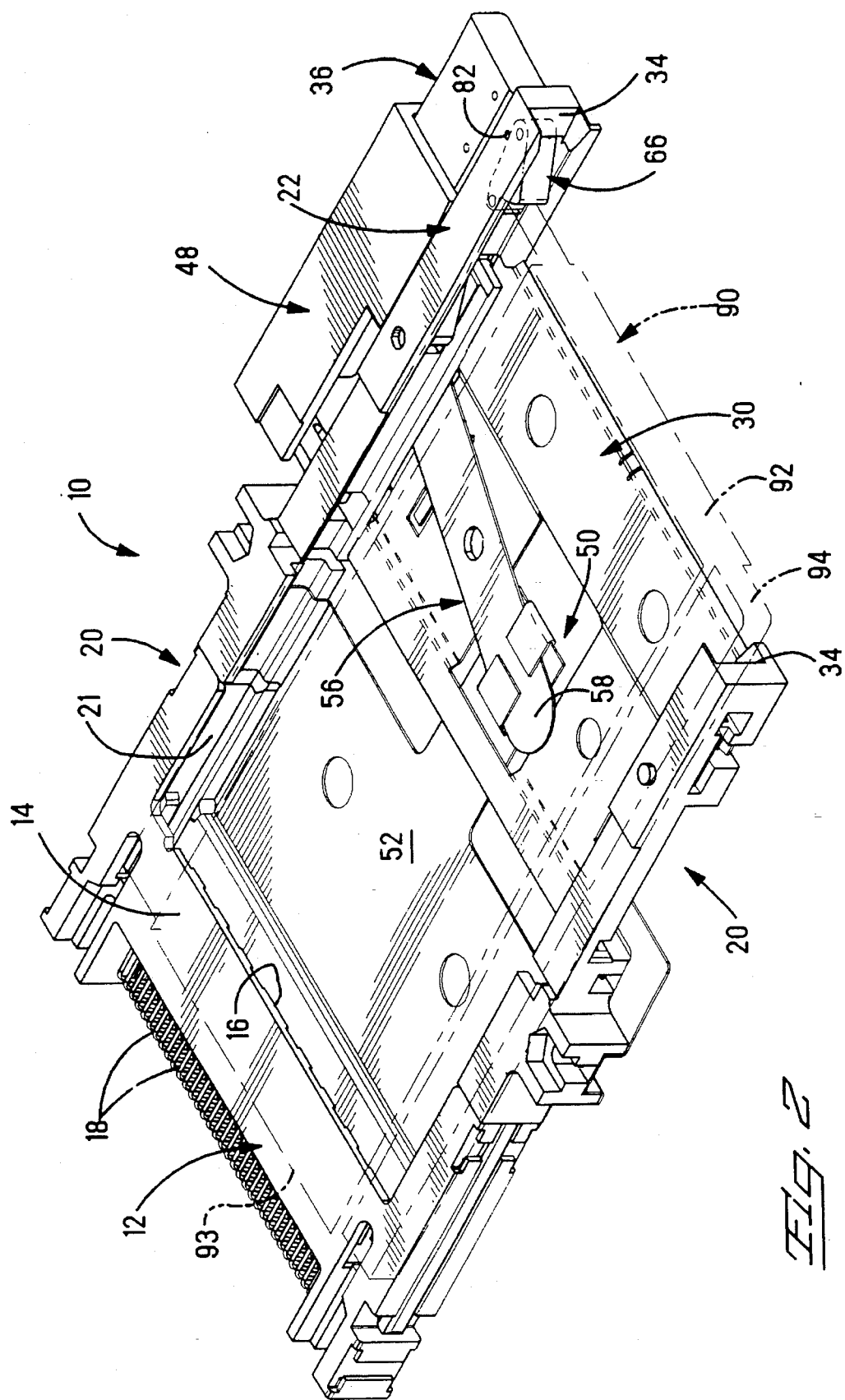
FIG. 2 is a perspective view of the memory card holder of FIG. 1 showing the card retention mechanism in its locked position, and a card, shown in phantom, inserted into the holder.
Figure 3:
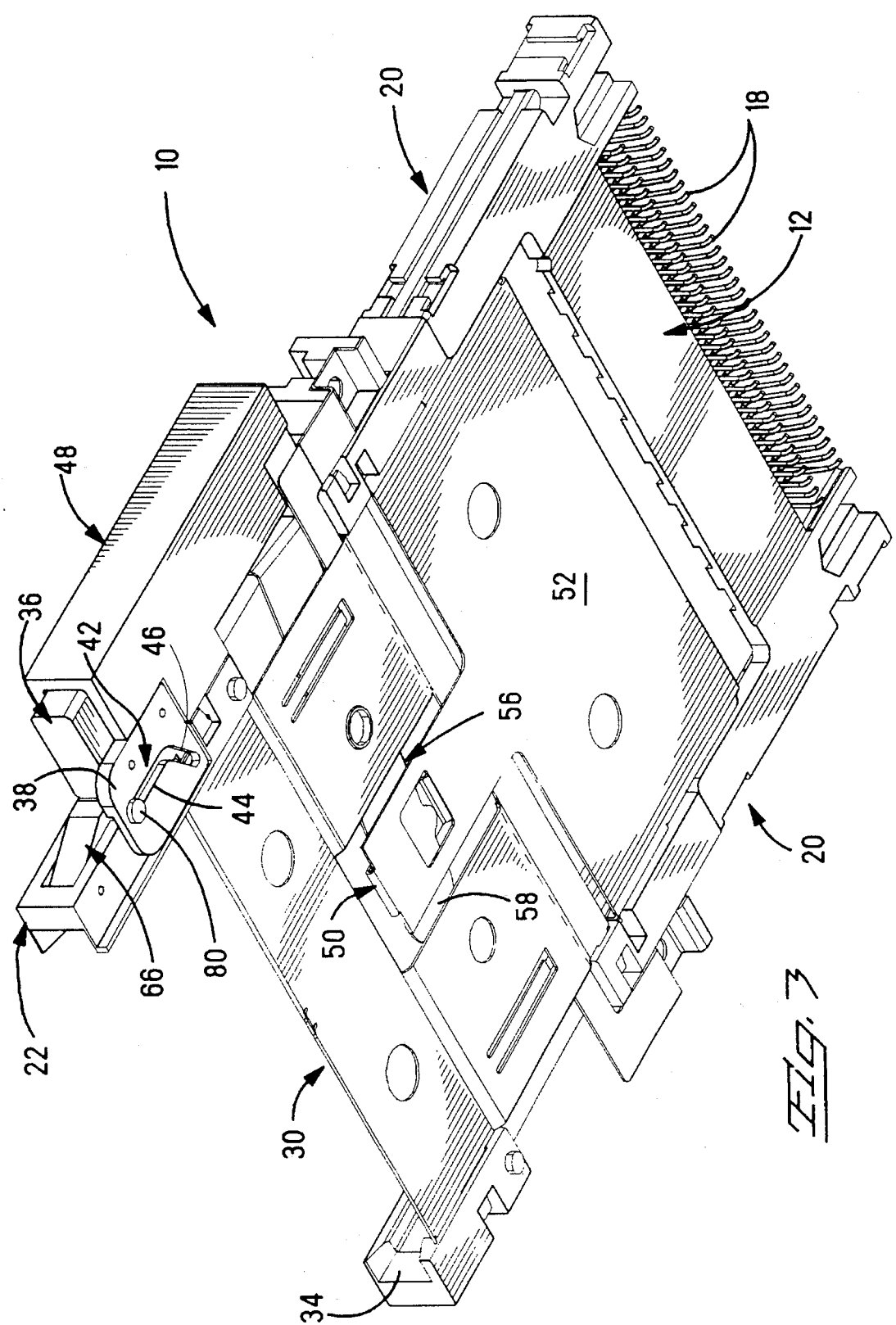
FIG. 3 is a perspective view of the card holder of FIG. 1 taken from the bottom surface thereof and showing the retention mechanism in its opened position.
Figure 4:
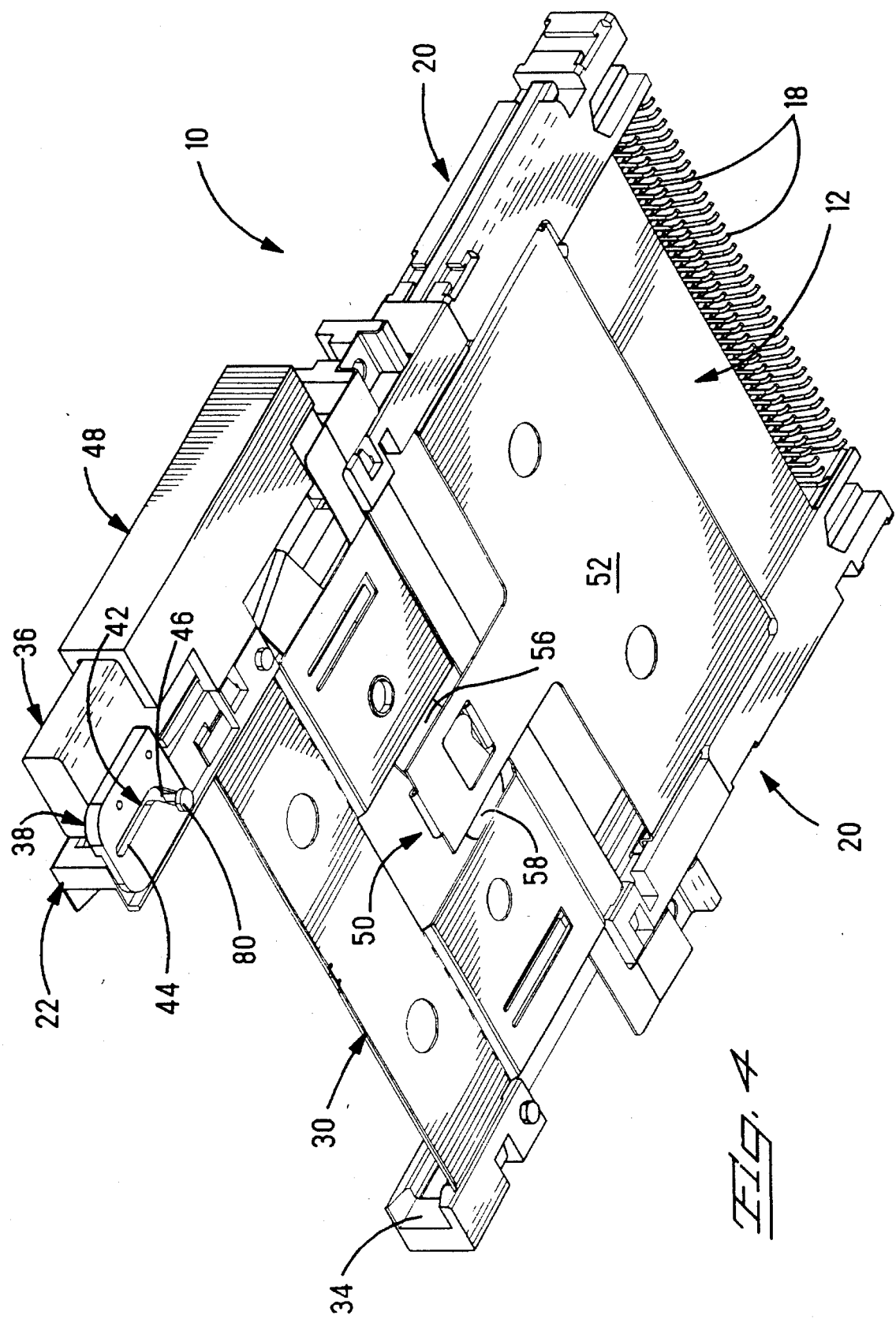
FIG. 4 is a view similar to FIG. 3 showing the retention mechanism in its closed position.

Referring now to FIGS. 1, 5, and 6, ejection mechanism 50 includes a sliding tray 52 having card engaging tabs 54 at the forward end thereof as seen in FIGS. 5 and 6, and a lever arm 56 having a tray engaging portion 58 and a push button engaging portion 60. It is to be understood that this ejection mechanism is only representative of the various types of ejection mechanisms operated by push buttons that are suitable for use with the present invention. It is to be understood that the card securing mechanism may also be used independently of an ejection mechanism, push button or other style as known in the art. The details of ejection mechanism 50 are more fully described in U.S. Pat. No. 5,318,452. FIGS. 2 and 6 show the positions of push button 36 and lever arm 56 when card 90 is fully inserted into card holder 10 and in electrical engagement with connector 12. FIGS. 1 and 5 show the positions of push button 36 and lever arm 56 after card 90 has been disengaged from the connector 12. FIG. 5 further shows the push button engaging portion 60, of lever arm 56 which resides in a 37 of the push button 36 and which is moved from a card engaging position (shown in FIG. 2) to a card releasing position (shown in FIG. 1) by depressing the push button 36.

FIGS. 5, and 6 illustrate the movement of the card securing mechanism as the card 90 is inserted into engagement with the card engaging tabs 54 of the tray 52 and into engagement with the terminals in connector 12 and the movement of the mechanism as the card 90 is released therefrom. FIG. 5 shows the card 90 ready to be inserted into card holder 10. Cam follower 80 on cam 66 moves along first path portion 44. The card engaging notch 76 remains rotated away from the card receiving channel 30 thereby allowing the card 90 to be received within the guide arms 20 and extension 22 and moved into position and engagement with the connector 12. As the card or leading end of the card 50 engages the card engaging tabs 54 and is moved inwardly, the push button is gradually moved outwardly by the pivoting arm 56. Cam follower 80 moves into second path portion 46 and cam 66 is pivotally moved until the surface of notch 76 engages a corner 96 of the card 50 after the card 90 has been fully inserted as shown in FIG. 6. FIG. 5 illustrates the movement of the cam 66 upon depressing the push button 36 to release the card 90 from card holder 10. As the push button 36 is moved into housing 48, cam follower 80 moves along the second path portion 46 and then along first path portion 44, thereby rotating or pivoting cam 66 about pivot pin 82 such that first cam portion 74 is moved out of card-receiving channel 30 thereby permitting card 90 to be removed from the card holder 10.

FIG. 9 illustrates the use of an extended memory card 190 in card holder 10. Card 190 includes a notch 198 along at least one of its side edges 194, which cooperates with the cam 66 in the same manner as previously described.

Figure 11:
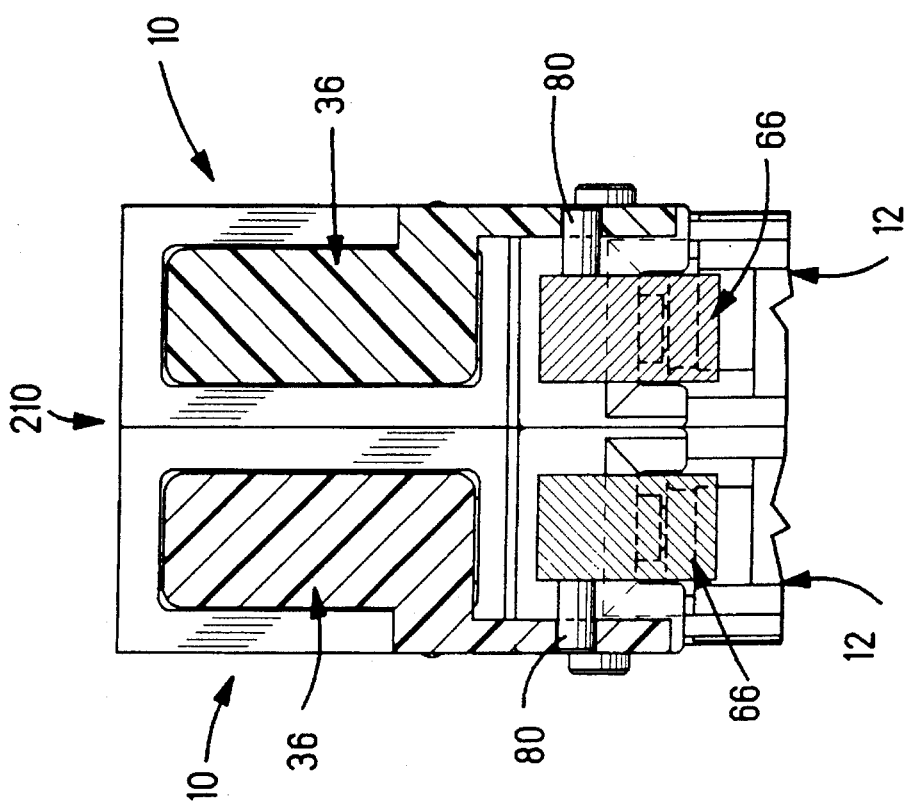
FIG. 11 is a view similar to FIG. 10 showing a stacked array of card holders having the card retention mechanism of the present invention.
Figure 10:
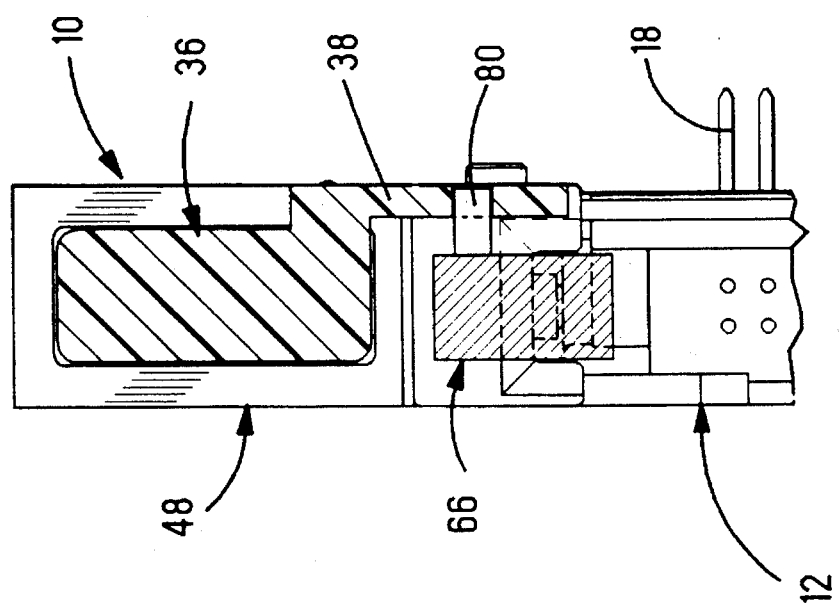
FIG. 10 is a partially sectioned front view illustrating the push button and cam mechanism taken along the line 10—10 of FIG. 6.

FIG. 10 is a fragmentary, partially sectioned view of a single card holder 10 taken along line 10—10 of FIG. 6, illustrating a one piece push button and plate structure with the cam in its open position. FIG. 11 illustrates the use of the securing mechanism of the present invention in a stacked memory card holder 210.

FIGS. 12–19 illustrate an alternative embodiment of the card securing mechanism of the present invention. Referring now to FIGS. 12, 13 and 14, a memory card holder 110 includes a pair of guide arms 20 spaced apart to define a card receiving channel 30 and aligned with an electrical connector 12 traversing the inward end of the channel 30, an ejection mechanism 50 for removing a card 90 from the holder 110, a push button 136 slidably mounted within a housing 48 and adapted to activate the card ejection mechanism 50 upon being pushed into the housing 48, and a cam 166 pivotally mounted to one of the arms beside the push button 136, the cam 166 being adapted to be rotated into and out of the card receiving channel 30 from a card engaging position to a card releasing position. The guide arms 20 extend along the ends of the electrical connector 12 and extend toward a card engageable surface, shown in FIG. 15 as tabs 54, of the card ejection mechanism 50 located at an inward end of the channel 30. The push button 136 which is mounted at the entrance 34 of the card receiving channel 30 is moveable alongside the channel and is adapted to activate the card ejection mechanism 50.

Figure 15:
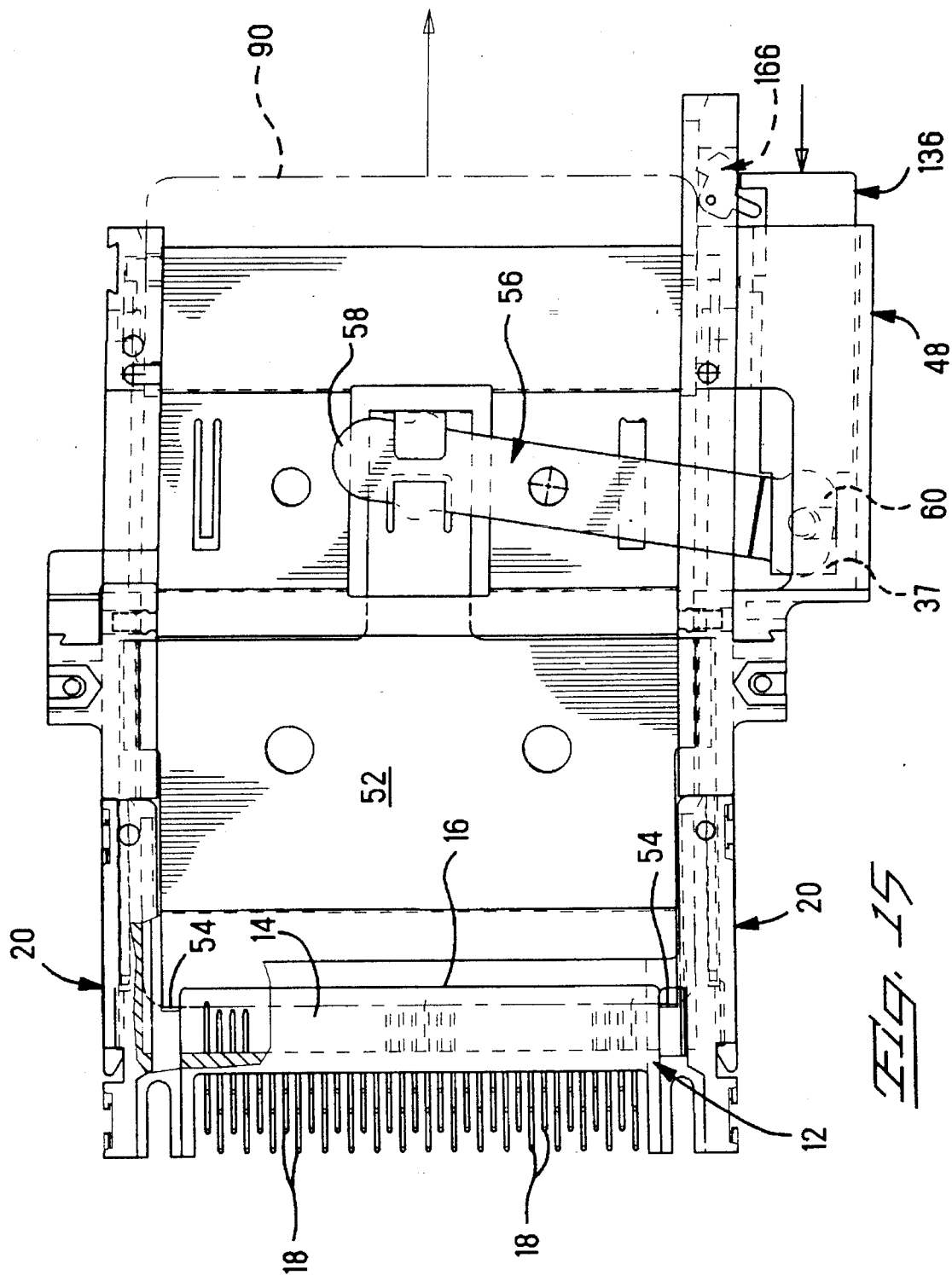
FIG. 15 is a top plan view of the memory card holder assembly of FIG. 12 illustrating the relationship between the push button, the ejection mechanism, and the card retention mechanism.

Push button 136 includes a slot 140 along the channel proximate side thereof defined between opposed actuation and end surfaces 142,144 as best seen in FIGS. 13 and 14. Push button 136 also includes slot 37 at the forward end thereof for receiving a portion 60 of the ejection lever arm 56 as best seen in FIG. 15. The guide arms 20 are associated with opposite side edges 94 of a card 90, the side edges of the card 94 being received in grooves 21 of the card guide arms as previously described. As can be seen in FIG. 12, one of the guide arms 20 includes a further portion 122 that extends the length of the side arm a sufficient distance to accommodate the cam 166. The cam 166 is pivotally mounted to portion 122 with pivot pin 182. The guide arm extension portion 122 includes apertures on the upper and lower surfaces thereof for receiving the pivot pin 182 that extends through the cam 166 when the unit is assembled. Guide arm extension 122 further includes a slot 128 through which a portion of the embossment 180 of cam 166 extends as can be seen in FIG. 13.

Cam 166, as shown in FIG. 19, includes opposed surfaces 168,170 having a pivot pin receiving aperture 175 extending therebetween. Cam 166 further has opposed first and second body portions 174,178. The first body portion 174 includes a notch 176 dimensioned to receive and secure a corner 96 of the card 90 when the card is fully inserted into the card holder 110. The second portion 178 includes the push button engageable embossment 180 adapted to be received in slot 140 of the push button 136 and to be pivoted from a card releasing position to a card engaging position by actuation surface 142 as shown in FIGS. 13 and 14 and from the card engaging position to a card releasing position by corner 96 of card 90 as card 90 is ejected from the holder 110. In the preferred embodiment, the push button 136 and cam 166 are made from die cast zinc or other suitable materials as known in the art.

Referring now to FIGS. 12 and 15, ejection mechanism 50 includes a sliding tray 52 having card engaging tabs 54 at the forward end thereof as seen in FIG. 15, and a lever arm 56 having a tray engaging portion 58 and a push button engaging portion 60 as previously described. It is to be understood that this ejection mechanism is only representative of the various types of ejection mechanisms operated by push buttons that are suitable for use with the present invention. It is to be understood that the card securing mechanism may also be used independently of an ejection mechanism, push button or other style as known in the art. FIG. 12 shows the positions of push button 136 and lever arm 56 when card 90 is fully inserted into card holder 110 and in electrical engagement with connector 12. FIG. 15 shows the positions of push button 136 and lever arm 56 after card 90 has been disengaged from the connector 12. FIG. 15 further shows the push button engaging portion 60, of lever arm 56 which resides in an aperture 38 of the push button and which is moved from a card engaging position (shown in FIG. 12) to a card releasing position (shown in FIG. 15) by depressing the push button 136.

Figure 17:
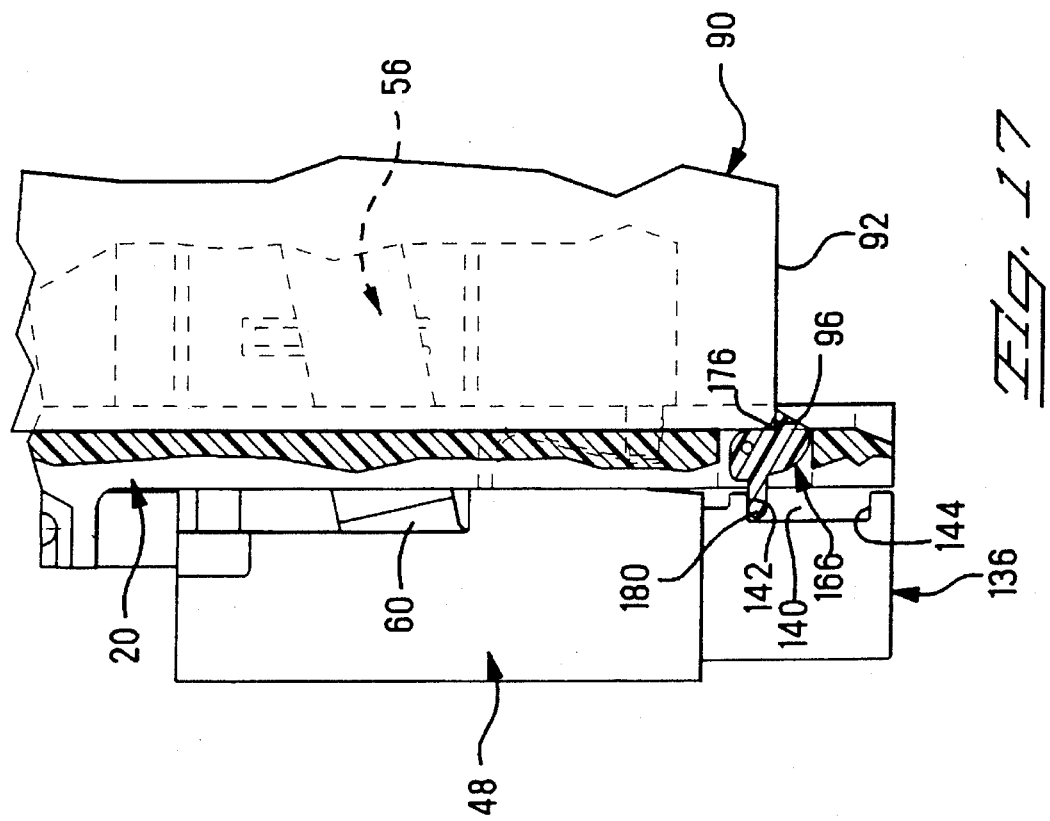
FIG. 17 is a view similar to that of FIG. 16 showing the card fully inserted into the memory card holder.
Figure 16:
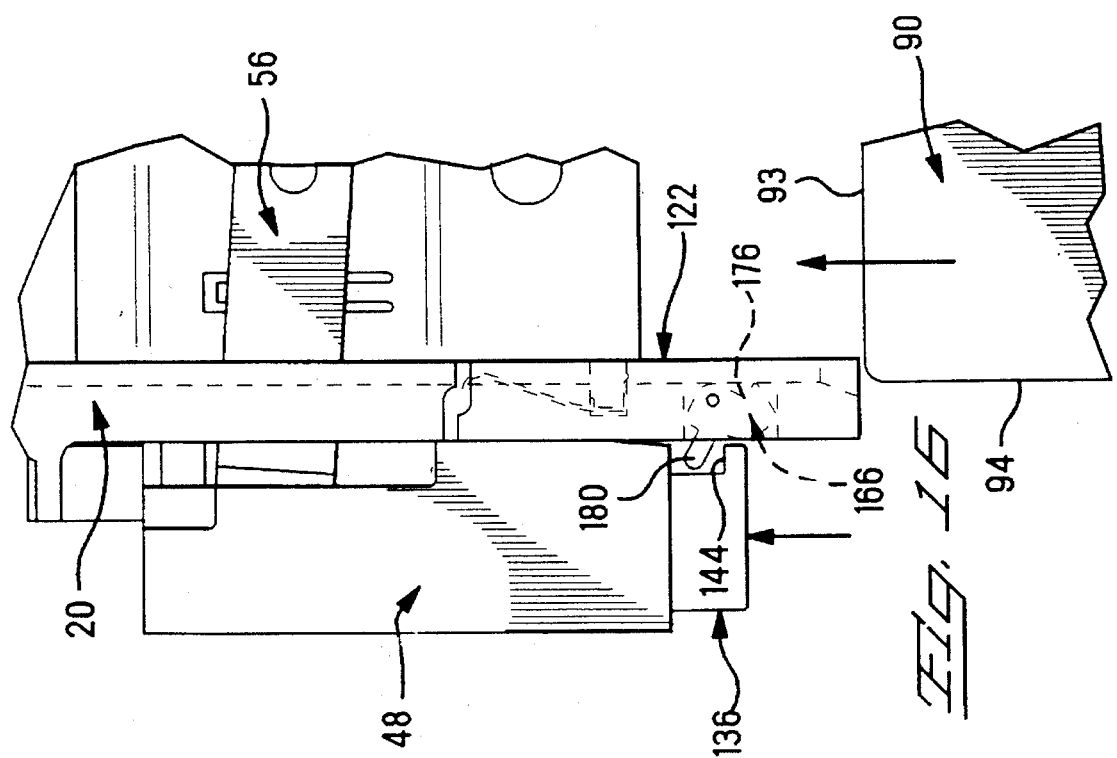
FIG. 16 is an enlarged fragmentary top plan view of the embodiment of FIG. 12 showing the position of the retention means prior to insertion of a card.

FIGS. 16, 17 and 18 illustrate the movement of the card securing mechanism as the card 90 is inserted into engagement with the card engaging tabs 54 (shown in FIG. 5) of the tray 52 and into engagement with the terminals in connector 12 and the movement of the mechanism as the card 90 is released therefrom. FIG. 16 shows the card 90 ready to be inserted into card holder 110. Embossment 180 on cam 166 lies within slot 140 of push button 136 and is spaced from actuation surface 142. The card engaging notch 176 is thus rotated away from the card receiving channel 30 thereby allowing the card 90 to be received within the guide arms 20 and extension 122 and moved into position and engagement with the connector 12. As the leading end 93 of the card 90 engages the card engaging tabs 54 and is moved inwardly, the push button 136 is gradually moved outwardly by the pivoting arm 56. When the first actuation surface 142 of slot 140 in push button 136 engages embossment 180, cam 166 is pivotally moved until the notch 176 engages a corner 96 of the card 90 after the card 90 has been fully inserted, as shown in FIG. 17. FIG. 18 illustrates the movement of the cam 166 upon depressing the push button 136 to release the card 90 from card holder 110. As the push button 136 is moved into housing 48, actuation surface 142 of slot 140 of the push button 136 moves away from the embossment 180, thereby permitting the rearward movement of card corner 96 to pivot cam 166 about the pivot pin 182 thus moving notch 176 out of the card receiving channel 30 and allowing the card 90 to be removed from the card holder 110.

In the preferred embodiment this invention provides a means for securing a card in a card holder that is activated by the same push button that activates a card ejection mechanism. It is to be understood that the ejection mechanism and the securing mechanism could be activated by independent push buttons if desired. One advantage of the present invention is that it permits the user to mount the card reader in a structure such that a removable cover can be extended across the push button to prevent unauthorized access to the ejection mechanism.

It is thought that the card retention mechanism of the present invention and many of its attendant advantages will be understood from the foregoing description. It is apparent that various changes may be made in the form, construction, and arrangement of parts thereof without departing from the spirit or scope of the invention, or sacrificing all of its material advantages.

We claim:

1. A card securing mechanism for retaining a card in a card reader and releasing same therefrom, comprising:

guide arms associated with opposite side edges of a card and mounted in the card reader and spaced apart so as to define a card-receiving channel aligned with an electrical connector traversing an inward end of the channel and said guide arms extending at least toward a card-engageable surface of a card ejection mechanism located at the inward end of the channel;

a cam pivotally mounted to said one of said arms proximate an entrance to the channel such that a first portion thereof can be rotated into and out of the card-receiving channel, said cam having a notch in said first portion thereof dimensioned to receive and secure a corner of said card when said card is fully within said reader and said first portion of said cam is rotated into the channel;

said cam further having a second portion thereof adapted to be engaged by an actuator activated by said card ejection mechanism upon card insertion such that upon full insertion of the card into the card-receiving channel said second portion is engaged by said actuator and said cam is pivoted to a card engaging position capturing said card corner and upon ejection of said card from said card reader by activation of said card ejector mechanism, said actuator at least permits said cam to be pivoted from a card engaging position to a card releasing position as the said card is urged outwardly of the channel by the card ejection mechanism.

2. The card securing mechanism of claim 1 wherein said actuator moves said cam to a card releasing position upon activation of said ejector mechanism.

3. The card securing mechanism of claim 1 wherein said actuator is disengaged from engagement with said second cam portion upon activation of said ejector mechanism thus enabling said cam to be pivoted by said card from said card engaging to said card releasing position.

4. A card securing mechanism for retaining a card in a card reader and releasing same therefrom, comprising:

guide arms associated with opposite side edges of a card and mounted in the card reader and spaced apart so as to define a card-receiving channel aligned with an electrical connector traversing an inward end of the channel and said guide arms extending at least toward a card-engageable surface of a card ejection mechanism located at the inward end of the channel;

a cam pivotally mounted at a pivot to said one of said arms proximate an entrance to the channel such that a first portion thereof can be rotated into and out of the card-receiving channel, said cam having a notch in said first portion thereof dimensioned to receive and secure a corner of said card when said card is fully within said reader and said first portion of said cam is rotated into the channel;

a plate at least affixed to the card reader adjacent said cam and including a slot into a cam-adjacent surface thereof defining a path including a first path portion parallel to said card-receiving channel and a second path portion extending at an angle from an inner end of said first path portion toward said card-receiving channel, said plate being movable parallel to said card-receiving channel by said card ejector mechanism, and said cam further including a cam follower spaced from said pivot and extending into said path and adapted to follow said first path portion and said second path portion as said plate is moved in a first direction upon card insertion to rotate said cam into a card engaging position capturing said card corner, and upon ejection of said card from said card reader by activation of said card ejector mechanism, said plate is moved in an opposed second direction and said cam follower exits said second path portion and enters said first path portion rotating said cam to a card releasing position as the said card is urged outwardly of the channel by the card ejection mechanism.

5. The card securing mechanism of claim 4 further including a push button mounted within a housing at an entrance to said card-receiving channel and slidable along one of said guide arms to activate the card ejection mechanism, said push button being adapted to be moved outwardly alongside said card by said card ejection mechanism during card insertion and adapted to move said cam follower along said path.

6. The card securing mechanism of claim 5 wherein said cam actuation member is an end surface of a slot along a channel proximate side of said push button.

7. The card securing mechanism of claim 5 wherein said plate is affixed to said push button member.

8. The card securing mechanism of claim 7 wherein said plate and said push button are formed as a unitary member.

9. A card securing mechanism for retaining a card in a card reader and releasing same therefrom, comprising:

guide arms associated with opposite side edges of a card and mounted in the card reader and spaced apart so as to define a card-receiving channel aligned with an electrical connector traversing an inward end of the channel and said guide arms extending at least toward a card-engageable surface of a card ejection mechanism located at the inward end of the channel;

a push button slidably mounted within a housing along one of said guide arms at an entrance to said card-receiving channel, said push button being movable alongside said card and adapted to activate the card ejection mechanism upon being pushed into said housing;

a cam pivotally mounted to said one of said arms at the channel entrance proximate and beside said push button for a first portion thereof to be rotated into and out of the card-receiving channel, said cam having a notch in said first portion thereof dimensioned to receive and secure a corner of said card when said card is fully within said reader and said first portion of said cam is rotated into the channel;

a plate at least affixed to the card reader adjacent said cam and including a slot into a cam-adjacent surface thereof defining a path including a first path portion parallel to said card-receiving channel and a second path portion extending at an angle from an inner end of said first path portion toward said card-receiving channel, said plate being movable parallel to said card-receiving channel by said push button, and said cam further including a cam follower spaced from said pivot and extending into said path and adapted to follow said first path portion and said second path portion as said plate is moved in a first direction upon card insertion to rotate said cam into a card engaging position capturing said card corner, and upon ejection of said card from said card reader by depressing said push button, said plate is moved in an opposed second direction and said cam follower exits said second path portion and enters said first path portion thereby rotating said cam to a card releasing position as the said card is urged outwardly of the channel by the card ejection mechanism activated by said push button.

10. A card securing mechanism for retaining a card in a card reader and releasing same therefrom, comprising:

guide arms associated with opposite side edges of a card and mounted in the card reader and spaced apart so as to define a card-receiving channel aligned with an electrical connector traversing an inward end of the channel and said guide arms extending at least toward a card-engageable surface of a card ejection mechanism located at the inward end of the channel;

a cam pivotally mounted to said one of said arms proximate an entrance to the channel such that a first portion thereof can be rotated into and out of the card-receiving channel, said cam having a notch in said first portion thereof dimensioned to receive and secure a corner of said card when said card is fully within said reader and said first portion of said cam is rotated into the channel;

said cam further having an embossment along an opposed second portion thereof adapted to be engaged by a cam actuation member activated by said card ejection mechanism upon card insertion such that upon full insertion of the card into the card-receiving channel said embossment is engaged by said actuation member and said cam is pivoted to a card engaging position capturing said card corner and upon ejection of said card from said card reader by activation of said card ejector mechanism, said actuation member is disengaged from engagement with said embossment thus enabling said cam to be pivoted by said card from a card engaging position to a card releasing position as the said card is urged outwardly of the channel by the card ejection mechanism.

11. The card securing mechanism of claim 10 further including a push button mounted within a housing at an entrance to said card-receiving channel and slidable along one of said guide arms to activate the card ejection mechanism, said push button being adapted to be moved outwardly alongside said card by said card ejection mechanism during card insertion and adapted to activate the cam embossment.

12. The card securing mechanism of claim 11 wherein said cam actuation member is an end surface of a slot along a channel proximate side of said push button.

13. A card securing mechanism for retaining a card in a card reader and releasing same therefrom, comprising:

guide arms associated with opposite side edges of a card and mounted in the card reader and spaced apart so as to define a card-receiving channel aligned with an electrical connector traversing an inward end of the channel and said guide arms extending at least toward a card-engageable surface of a card ejection mechanism located at the inward end of the channel;

a push button slidably mounted within a housing along one of said guide arms at an entrance to said card-receiving channel, said push button being movable alongside said card and adapted to activate the card ejection mechanism upon being pushed into said housing;

a cam pivotally mounted to said one of said arms at the channel entrance proximate and beside said push button for a first portion thereof to be rotated into and out of the card-receiving channel, said cam having a notch in said first portion thereof dimensioned to receive and secure a corner of said card when said card is fully within said reader and said first portion of said cam is rotated into the channel;

said cam further having a push button engageable embossment along an opposed second portion thereof adapted to be received in a slot along a channel proximate side of said push button defined between opposed actuation and rearward surfaces, upon full insertion of the card into the card-receiving channel said embossment is engaged by said actuation surface and said cam is pivoted to a card engaging position capturing said card corner, and further adapted such that upon depressing said button, said actuation surface is disengaged from engagement with said embossment enabling said cam to be pivoted from a card engaging position to a card releasing position by said corner of said card as the said card is urged outwardly of the channel by the card ejection mechanism activated by the push button.

14. The card securing mechanism of claim 13 wherein said cam actuation member is an end surface of a slot along a channel proximate side of said push button.

* * * * *